United States Patent [19]

Dicky

[11] Patent Number: 4,854,508

[45] Date of Patent: Aug. 8, 1989

[54] TIRE SHREDDING MACHINE

[75] Inventor: John Dicky, North Tonawanda, N.Y.

[73] Assignee: Columbus McKinnon Corporation, Amherst, N.Y.

[21] Appl. No.: 254,218

[22] Filed: Oct. 6, 1988

[51] Int. Cl.[4] .......................... B02C 4/08; B02C 4/30
[52] U.S. Cl. .................................. 241/236; 241/294; 241/300; 241/DIG. 31
[58] Field of Search ............... 241/236, 243, DIG. 38, 241/DIG. 31, 293, 294, 295, 300, 197, 194, 191, 195

[56] References Cited

U.S. PATENT DOCUMENTS 3,146,961 9/1964 Putman ........................... 241/294 X
4,374,573 2/1983 Rouse et al. ..................... 241/236 X
4,773,605 9/1988 Jensen .............................. 241/294 X Primary Examiner—Mark Rosenbaum
Attorney, Agent, or Firm—Bean, Kauffman & Spencer

[57] ABSTRACT

There is disclosed for use in a machine for shredding scrap automotive tires or the like of the type comprising a pair of oppositely rotating rotors having interdigitated tire cutting discs keyed thereon and replaceable abrasion resistant wearing plates at opposite sides of said disc, an improved means for locking said plates in operative positions on said discs, whereby worn plates may be replaced by new plates from externally of the rotors without requiring costly disassembly and reassembly thereof.

7 Claims, 2 Drawing Sheets

U.S. Patent  Aug. 8, 1989  Sheet 1 of 2  4,854,508
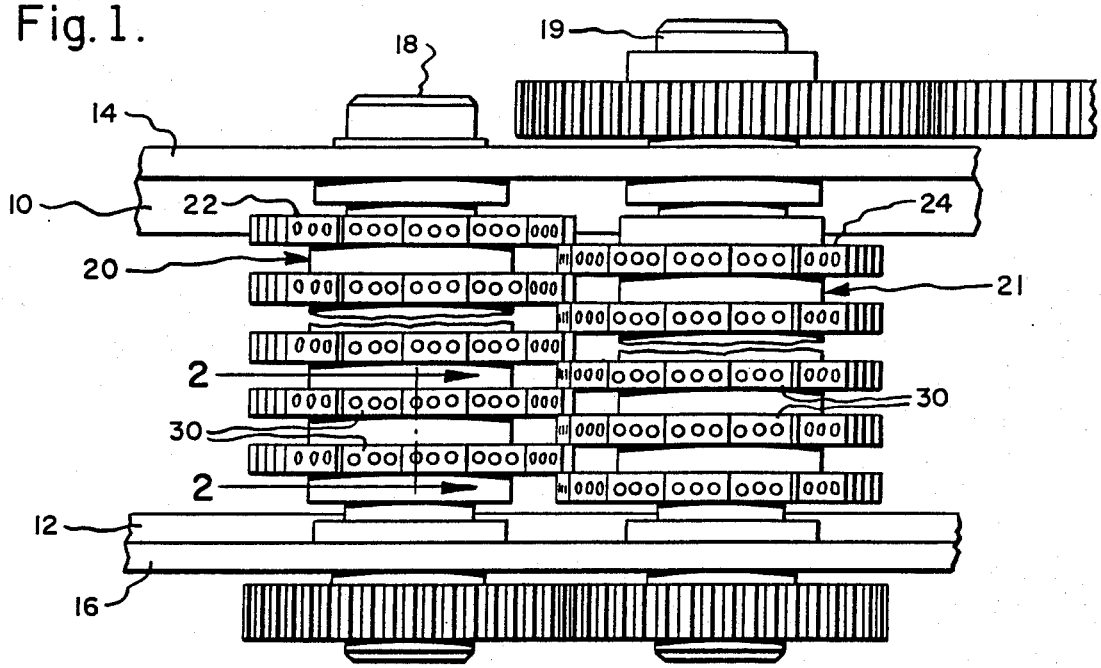
Fig. 1.
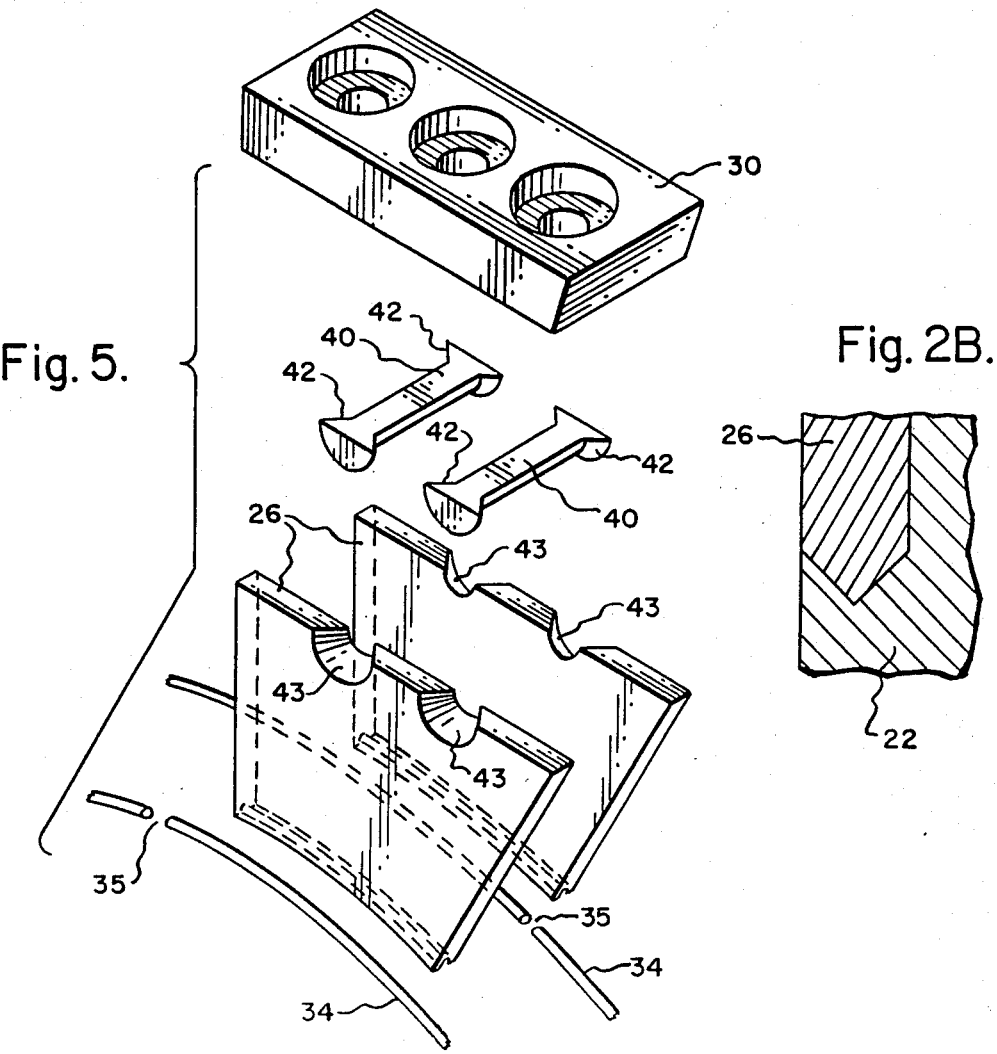
Fig. 5.
Fig. 2B.

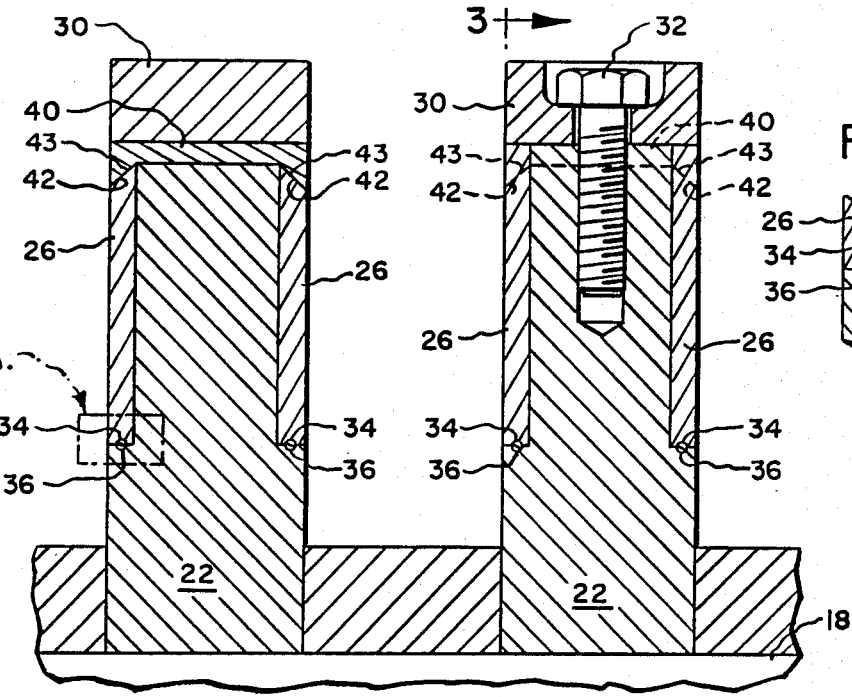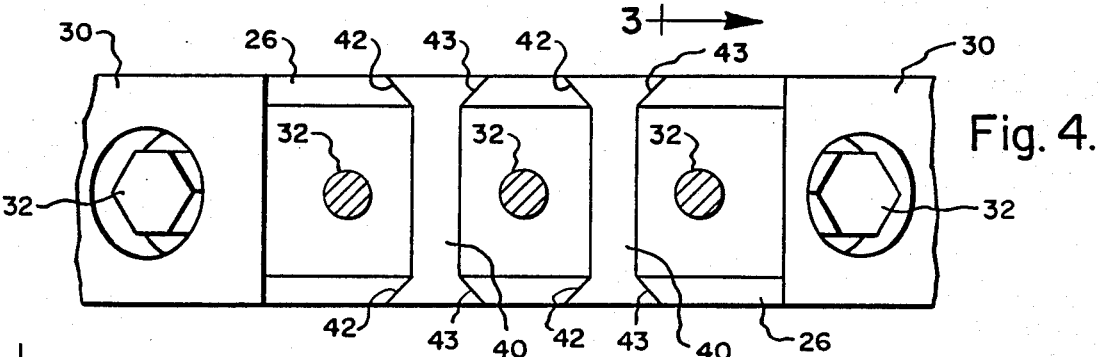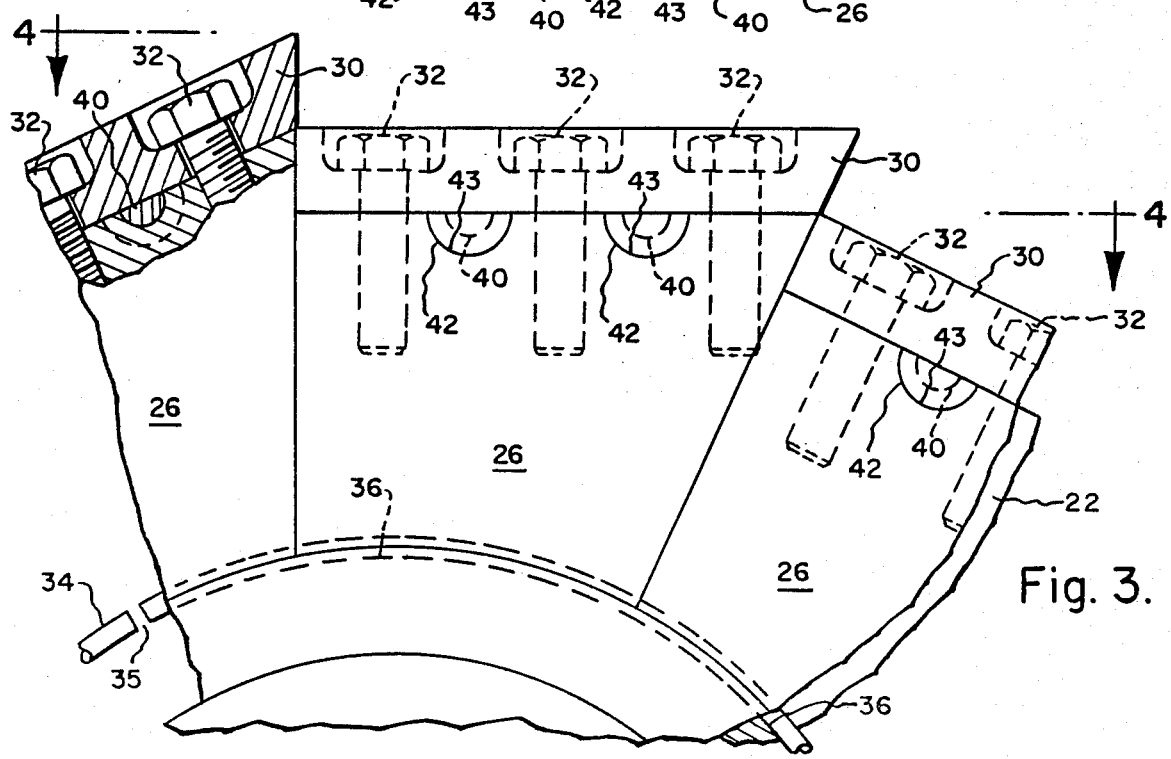

TIRE SHREDDING MACHINE

BACKGROUND AND OBJECTS OF THE INVENTION

This invention relates to apparatus for mechanically chopping, shearing or shredding solid materials such as scrap automobile and truck tires; scrap insulated electrical conductors; beverage cans; and other solid waste materials required to be reduced to substantially uniform smaller particulate sizes for efficient permanent disposal, commercial recycling, or other utilization. Typically, systems for such purposes include conveyor means for carrying materials to be processed from ground level to the in-feed of a chopper or shredding machine (which for convenience will hereinafter be referred to as the shredder); a screening (or "classifying") device for receiving the produce from the shredder and passing to discharge product fragments of prescribed sizes; and elevator means for returning oversized products to the shredder mechanism. Machines for similar purposes are disclosed for example in U.S. Pat. Nos. 3,578,252; 3,656,697; 3,727,850; 3,841,570; 3,931,935; 4,134,556; 4,156,508; 4,216,916; 4,363,450; 4,684,070 and 4,684,071.

The shredder component of such systems typically comprises a multiplicity of spaced apart discs carried by parallel mounted counter-rotating drive shafts in such manner that the discs of one shaft interdigitally project at their perimetral regions in between the discs carried by the other shaft. The discs mount around their perimetral rims successions of canted cutting blades as shown for example at 26 in U.S. Pat. No. 4,684,071 and at 174 in U.S. Pat. No. 4,374,573. As best shown at FIGS. 10 and 11 of U.S. Pat. No. 4,374,573, replaceable abrasion resistant wearing plates 172 are mounted on opposite sides of the discs under the "cutter segments" 174. Whereas the provision of rotating disc protecting replaceable wearing plates for such purposes has proven to be of important economic advantage, the means shown therein for exchanging new plates for worn plates on the cutter discs has proven to require difficult and time-consuming and therefore unduly expensive maintenance work; and it is the object of the present invention to provide an important improvement in the means for installing such plates to the cutter discs, and for facilitating the replacement of plates for worn plates.

BRIEF DESCRIPTION OF THE DRAWING

FIG. 1 is a fragmentary top plan view of a shredding machine embodying the features of a presently preferred form of the present invention;

FIG. 2 is an enlarged scale fragmentary sectional view taken along line 2—2 of FIG. 1;

FIG. 2A is an enlarged scale fragmentary view of the portion of FIG. 2 that is outlined and designated 2A at the left hand side thereof;

FIG. 2B is a view corresponding to FIG. 2A showing a modification thereof;

FIG. 3 is a sectional view taken as along line 3—3 of FIG. 2;

FIG. 4 is a partially elevational and partially sectional view taken as along line 4—4 of FIG. 3; and FIG. 5 is an exploded view in perspective of the wearing plate and locking means of the invention.

DESCRIPTION OF A PREFERRED EMBODIMENT OF THE INVENTION

As shown by way of example in the drawing herewith, the shredding machine frame structure includes a pair of oppositely disposed sill members 10,12 from which vertically extend corresponding side wall members 14,16. A pair of drive shafts 18,19 are journalled at their opposite ends in the side walls 14,16 and carry in keyed relation thereon a pair of rolls 20,21, each of which mounts thereon spaced apart discs 22,24, respectively. The rolls 20,21 are so disposed and the parts are so dimensional that the rim portions of alternate discs slide-fit interdigitally to provide a scissor-like cutting action on the feed material as the discs rotate. A plurality of wearing plates 26 are mounted against opposite sides of the rim portions of each of the discs, and corresponding cutter plates 30 are mounted thereon by means of machine screws 32, so as to cap the assembly and lock down the cutter and wearing plates as best shown at FIGS. 2 and 3.

A "tongue and groove" arrangement is employed in order to maintain the wearing plates 26 against the sides of the discs at the bottom ends of the plates. As shown at FIGS. 2, 2A, 3 and 5, a preferred arrangement includes snap rings 34 of spring steel which are disposed in grooved portions 36 of the discs, and the bottom surfaces of the wearing plates 26 are similarly grooved as best shown at FIG. 2A so as to straddle the snap rings. Note that the snap rings are C-shaped and discontinuous as shown at 35 (FIG. 5) to permit their assembly on the discs 22,24. In order to maintain the wearing plates at their upper ends against the discs, a novel form of transversely disposed holding pins are employed as shown by way of example at FIGS. 2 and 3. As shown, the pins 40 are semi-circular in sectional form and are enlarged at the opposite ends thereof by semi-circular flared out end portions 42. These pins are disposed within semi-circular grooved portions of the discs 24, and their flared end portions nest into complementarily shaped hollowed portions 43 of the wearing plates 26. However, it is to be understood that the pins 40 may be of any other sectional form instead of semi-cylindrical as shown.

Thus, it will be appreciated that when the wearing plates 26 are radially inwardly inserted into registry with the snap rings 34 at their lower ends, and the locking pins 40 are settled in place at their upper ends, and the cutting blades 30 are locked downwardly thereupon by the screws 32, the assembly is firmly fastened in place. However, it is a particular feature of the present invention that whenever the wearing plates 26 are due for replacement, the entire repair operation may be performed without any special tools and from externally of the rotor assembly. A standard socket wrench need only be applied to the heads of the machine screws 32 for withdrawal of the cutter bars 30 from the top of the assembly.

This frees the lock pins 40 for removal and withdrawal of the worn wearing plates from their bottom end anchorages on the snap rings 34. Replacement wearing plates are thereupon inserted; and locking pins 40 and either previously used or new cutting blocks 30 are reinstalled in assembly locking position by machine screws 32. Because the rim portions of the discs are sandwiched between similar disc rim portions of the opposite rotor, in the case of the prior art whenever a wearing plate replacement is required it is only feasible (but time and cost wise expensive) to take the rotors out of the machine for transport to a shop facility for replacements of the worn wearing plates by means of special tools. Such tools would need to be adapted to reach in between adjacent discs and to manipulate the plate locking means such as the bolts 188 of U.S. Pat. No. 4,374,573. FIG. 2B shows how a simple form of tongue and groove arrangement may be employed in lieu of the plate anchoring means including the snap rings 34. In this case, the discs 22 and the bottom edges of the plates 26 are sectionally shaped so as to fit together in complemettary tongue and groove fashion. Instead of the V-shaped sectional form as shown at FIG. 2B, any other polygonal or curvilinear shape may be employed. Selection of the preferred form may depend upon the machining method to be used.

Accordingly, the present invention provides an improved wearing plate mounting and replacement system for machines designed for shredding scrap tires or the like. When machines embodying the present invention are operating upon materials of a plastic nature, the initially open spaces about the heads of the machine screws 32 may in time become impacted by remnants of the material being processed. However, for example a hand held rotating cylindrical saw may then be employed to clear away such debris from the heads of the screws and a conventional socket wrench may then be employed from externally of the rotor incidental to a wearing plate replacement operation as described hereinabove.

What is claimed is:

1. A machine for shredding scrap automotive tires or the like of the type including a pair of oppositely rotating rotors having interdigitated tire cutting discs keyed thereon and replaceable abrasion resistant wearing plates extending radially alongside opposite sides of said discs, and the improvement comprising:

said plates being positionally anchored at their radially inner ends against the sides of said discs by means of tongue and groove interconnecting surfaces, and anchored at their radially outer ends against the sides of said discs by means of transversely disposed locking pins residing in complementary shaped grooved portions of the outer end surfaces of said discs and said wearing plates; said pins having enlarged head portions at opposite ends thereof locking said wear plates relative to said discs.

2. A machine as set forth in claim 1 wherein said pins are of semi-circular sectional form and said grooved portions of said discs and said wearing plate are of semi-circular sectional form.

3. A machine as set forth in claim 2 wherein cutter blades are mounted against the outer extending end portions of said pins and said discs and said wearing plates, and are detachably locked to said discs.

4. A machine as set forth in claim 3 wherein the interfacing surfaces of said discs and said wearing plates are formed with oppositely facing semi-circular sectional grooves so as to form a circularly sectioned cavity therebetween and a circular sectioned snap ring is disposed in said cavity.

5. A machine as set forth in claim 1 wherein said tongue and groove surfaces are of complementing sectional angular shapes.

6. A machine as set forth in claim 5 wherein the interfacing surfaces of said discs and said wearing plates are formed with oppositely facing semi-circular sectional grooves so as to form a circularly sectioned cavity therebetween and a circular sectioned snap ring is disposed in said cavity.

7. A machine as set forth in claim 1 wherein the interfacing surfaces of said discs and said wearing plates are formed with oppositely facing semi-circular sectional grooves so as to form a circularly sectioned cavity therebetween and a circular sectioned snap ring is disposed in said cavity.

* * * * *